(12) United States Patent
Couillard et al.

(10) Patent No.: US 12,242,904 B2
(45) Date of Patent: *Mar. 4, 2025

(54) COMPUTERIZED SYSTEMS AND METHODS FOR CONFIGURATION OF NETWORK INTERFACES OF A DISTRIBUTED NETWORK

(71) Applicant: Tassat Group Inc., New York, NY (US)

(72) Inventors: Eric Couillard, New York, NY (US); Sanjaya Kulkarni, Edison, NJ (US); Sanjay Deshpande, East Brunswick, NJ (US)

(73) Assignee: Tassat Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,097

(22) Filed: Oct. 23, 2023

(65) Prior Publication Data
US 2024/0202054 A1 Jun. 20, 2024

Related U.S. Application Data

(63) Continuation of application No. 18/068,349, filed on Dec. 19, 2022, now Pat. No. 11,797,365.

(51) Int. Cl.
*G06F 9/54* (2006.01)
*G06F 9/445* (2018.01)
*H04L 9/40* (2022.01)

(52) U.S. Cl.
CPC .......... *G06F 9/547* (2013.01); *G06F 9/44505* (2013.01); *H04L 63/10* (2013.01)

(58) Field of Classification Search
CPC ....... G06F 9/547; G06F 9/44505; H04L 63/10
See application file for complete search history.

(56) References Cited

U.S. PATENT DOCUMENTS 11,494,343 B1 11/2022 Lupowitz et al.
11,797,365 B1 10/2023 Couillard et al.
(Continued)

OTHER PUBLICATIONS

Kaleido, "Simplify Blockchain Development With Powerful APIs". pp. 1-6. (Year: 2020).*

(Continued)

*Primary Examiner* — Kevin L Young
*Assistant Examiner* — Phuong N Hoang
(74) *Attorney, Agent, or Firm* — GREENBERG TRAURIG, LLP

(57) ABSTRACT

According to some embodiments, the disclosed systems and methods provide non-native functionality to a distributed network for administrative customizations and control of network-hosted and/or blockchain-related application program interfaces (APIs). The disclosed technology provides novel techniques and mechanisms for administrating and/or configuring microservice API requests, whereby customized definitions, operations and executable instructions may cause and/or otherwise have associated information stored in a distributed ledger (e.g., blockchain). In some embodiments, the disclosed functionality and capabilities provided by the disclosed framework enable capabilities for API administration and configuration respective to how workflows of microservices are hosted, executed and stored within and respective to data structures and nodes of a blockchain.

19 Claims, 9 Drawing Sheets

(56) References Cited

U.S. PATENT DOCUMENTS

| | | | |
|---|---|---|---|
| 2010/0031335 A1* | 2/2010 | Handler | H04L 63/08 |
| | | | 726/8 |
| 2016/0004731 A1 | 1/2016 | Sivasubramanian et al. | |
| 2016/0127454 A1* | 5/2016 | Maheshwari | G06F 8/30 |
| | | | 709/223 |
| 2018/0196851 A1* | 7/2018 | Srivastava | G06F 9/54 |
| 2018/0232403 A1* | 8/2018 | Bhatti | G06F 16/252 |
| 2018/0321993 A1 | 11/2018 | McClory et al. | |
| 2019/0171744 A1* | 6/2019 | Ananthapur Bache | |
| | | | H04L 9/0637 |
| 2019/0220289 A1* | 7/2019 | Driesen | G06F 9/44505 |
| 2020/0021590 A1 | 1/2020 | Jeuk et al. | |
| 2020/0201560 A1 | 6/2020 | Yang et al. | |
| 2020/0213093 A1 | 7/2020 | Zhang et al. | |
| 2020/0301674 A1 | 9/2020 | Swope et al. | |
| 2020/0342449 A1* | 10/2020 | Lai | G06F 16/2379 |
| 2022/0114174 A1* | 4/2022 | Glass | G06F 16/248 |
| 2022/0417316 A1 | 12/2022 | Palvadeau et al. | |

OTHER PUBLICATIONS

Seijas, "Scripting smart contracts for distributed ledger technology", pp. 1-30. (Year: 2017).*

Qurnhieh, "Extending Oracle Blockchain Events with OCI—Part 1 (Introduction)", A-Team Chronicles, pp. 1-5, 2020.

International Search Report and Written Opinion from International Application No. PCT/US2023/077514 dated Feb. 14, 2024.

* cited by examiner

COMPUTERIZED SYSTEMS AND METHODS FOR CONFIGURATION OF NETWORK INTERFACES OF A DISTRIBUTED NETWORK

FIELD OF TECHNOLOGY

The present disclosure generally relates to computer-based systems configured for administrative customizations and control of application program interfaces (APIs) and methods of use thereof.

BACKGROUND OF TECHNOLOGY

Within blockchain storage and networking environments, an API is an interface that communicates with a blockchain node or client network directly or through another service. APIs enable services and platform-related functionality to be hosted and provided to requesting entities, and may correspond to particular types of services or microservices that may be called, requested and executed.

BRIEF SUMMARY

According to some embodiments, described herein is a system for administrative customizations and control of network-hosted and/or blockchain-related APIs. The system includes at least one processor in communication with at least one storage device. The at least one processor includes: a distributed ledger of a distributed network; where the distributed network includes a plurality of distributed network nodes; where each distributed network node of the plurality of distributed network nodes includes a computing device associated with at least one entity; where each distributed network node includes at least one distributed network data store configured to store distributed network-based data objects for the at least one entity; at least one microservice orchestrator configured to control a plurality of microservices; where the plurality of microservices is configured to execute a plurality of workflows associated with administering distributed network configurations defining a plurality of parameters associated with the plurality of distributed network data stores; where the at least one microservice orchestrator is configured to: receive, via at least one configuration application programming interface (API), a configuration API request; where the configuration API defines a configuration API request structure including: a configuration API request header and a configuration API request body; where the configuration API request includes: at least one configuration API request header value according to the configuration API request header, and at least one configuration API request body value according to the configuration API request body; determine, based on the at least one configuration API request body value, at least one workflow microservice configured to execute at least one workflow associated with performing a configuration operation to affect at least one parameter of the plurality of parameters on behalf of an entity; access, in at least one memory structure, a mapping of distributed network data stores; where the mapping of distributed network data stores links the plurality of distributed network data stores to a plurality of centralized entity profiles; control the at least one workflow microservice to execute the at least one workflow to: generate at least one updated parameter associated with the entity based at least in part on the at least one configuration API request body value, where the at least one updated parameter includes at least one change to the at least one parameter, generate a modification to the mapping of distributed network data stores based at least in part on the at least one updated parameter, and store the modification in the at least one memory structure so as to execute the configuration operation.

According to some embodiments, a method is provided for administrative customizations and control of network-hosted and/or blockchain-related APIs. The method includes: receiving, by a device, via at least one configuration application programming interface (API), a configuration API request, the configuration API defines a configuration API request structure including a configuration API request header and a configuration API request body, where the configuration API request includes at least one configuration API request header value according to the configuration API request header, and at least one configuration API request body value according to the configuration API request body; determining, by the device, based on the at least one configuration API request body value, at least one workflow microservice configured to execute at least one workflow associated with performing a configuration operation to affect at least one parameter of the plurality of parameters on behalf of an entity; accessing, by the device, in at least one memory structure, a mapping of distributed network data stores, the mapping of distributed network data stores links the plurality of distributed network data stores to a plurality of centralized entity profiles; and controlling, by the device, the at least one workflow microservice to execute the at least one workflow to: generate, by the device, at least one updated parameter associated with the entity based at least in part on the at least one configuration API request body value, the at least one updated parameter includes at least one change to the at least one parameter, generate, by the device a modification to the mapping of distributed network data stores based at least in part on the at least one updated parameter, and store, by the device, the modification in the at least one memory structure so as to execute the configuration operation According to some embodiments, described herein is a non-transitory computer-readable storage medium that has tangibly stored thereon, or tangibly encoded thereon, computer readable instructions that when executed by at least one processor of a device cause the at least one processor to perform a method for administrative customizations and control of network-hosted and/or blockchain-related APIs. The computer-executed method, as executed from the computer-executable instructions stored on the non-transitory computer-readable storage medium, includes: receiving, by the device, via at least one configuration application programming interface (API), a configuration API request, the configuration API defines a configuration API request structure including a configuration API request header and a configuration API request body, where the configuration API request includes at least one configuration API request header value according to the configuration API request header, and at least one configuration API request body value according to the configuration API request body; determining, by the device, based on the at least one configuration API request body value, at least one workflow microservice configured to execute at least one workflow associated with performing a configuration operation to affect at least one parameter of the plurality of parameters on behalf of an entity; accessing, by the device, in at least one memory structure, a mapping of distributed network data stores, the mapping of distributed network data stores links the plurality of distributed network data stores to a plurality of centralized entity profiles; and controlling, by the device, the at least one workflow microservice to execute the at least one workflow to: generate, by the device, at least one updated parameter associated with the entity based at least in part on the at least one configuration API request body value, the at least one updated parameter includes at least one change to the at least one parameter, generate, by the device a modification to the mapping of distributed network data stores based at least in part on the at least one updated parameter, and store, by the device, the modification in the at least one memory structure so as to execute the configuration operation.

In some embodiments, one or more systems and/or methods are disclosed which further include where the at least one microservice orchestrator is further configured to: determine a source device associated with the configuration API request; determine an authorization status of an administrative authorization of the source device, where the authorization status includes at least one of: the administrative authorization, a user authorization, and unauthorized; and control the at least one workflow microservice to execute the at least one workflow based at least in part on the authorization status being the administrative authorization.

In some embodiments, one or more systems and/or methods are disclosed which further include where the mapping of distributed network data stores includes at least one entity-specific data record that is configured to link at least one entity-specific network data store to at least one entity-specific entity profile.

In some embodiments, one or more systems and/or methods are disclosed which further include where the at least one entity-specific data record includes a plurality of parameters representing at least one characteristic of the entity, where the plurality of parameters include at least one of: an entity identifier, an entity name, entity contact data, an entity access status, an entity authentication status, an entity token API and an entity wire API.

In some embodiments, one or more systems and/or methods are disclosed which further include where the mapping of distributed network data stores includes an index having a plurality of entity-specific entries; where at least one entity-specific entry of the index is configured to link at least one entity-specific network data store to at least one entity-specific entity profile.

In some embodiments, one or more systems and/or methods are disclosed which further include where the at least one microservice orchestrator is further configured to synchronize the mapping of distributed network data stores across a distributed network of distributed network nodes.

In some embodiments, one or more systems and/or methods are disclosed which further include where the at least one microservice orchestrator is further configured to: determine permissioned distributed network nodes in the distributed network of distributed network nodes; where the distributed network includes a private-permissioned blockchain; and synchronize the mapping of distributed network data stores across the permissioned distributed network nodes.

In some embodiments, one or more systems and/or methods are disclosed which further include where the at least one microservice orchestrator is further configured to: receive, from at least one transaction smart contract, at least one distributed ledger transaction associated with at least one distributed network data store; where the at least one distributed ledger transaction is executed on at least one distributed ledger of a distributed network; where the distributed network includes a plurality of distributed network nodes; control at least one transaction microservice to execute at least one workflow to: access the mapping of distributed network data stores; determine at least one centralized entity profile of the plurality of centralized entity profiles based at least in part on the mapping of distributed network data stores; where the at least one centralized entity profile is linked to the at least one distributed network data store in the mapping of distributed network data stores; generate at least one platform instruction configured to cause at least one centralized profile platform to execute at least one profile transaction with respect to the at least one centralized entity profile based at least in part on the at least one distributed ledger transaction; receive, from the at least one centralized profile platform, a confirmation of execution of the at least one profile transaction; and generate at least one distributed ledger instruction configured to cause the at least one transaction smart contract to execute the at least one distributed ledger transaction with respect to the at least one distributed network data store based at least in part on the confirmation of execution of the at least one profile transaction.

In some embodiments, one or more systems and/or methods are disclosed which further include where the at least one distributed ledger transaction may be associated with reference data, where the reference data may include information related to the at least one transaction and may be stored in a database table.

In some embodiments, one or more systems and/or methods are disclosed which further include where the reference data may be utilized to update reference data associated with a third party platform, where the third party platform may correspond to a bank and/or currency hosting and/or providing platform.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
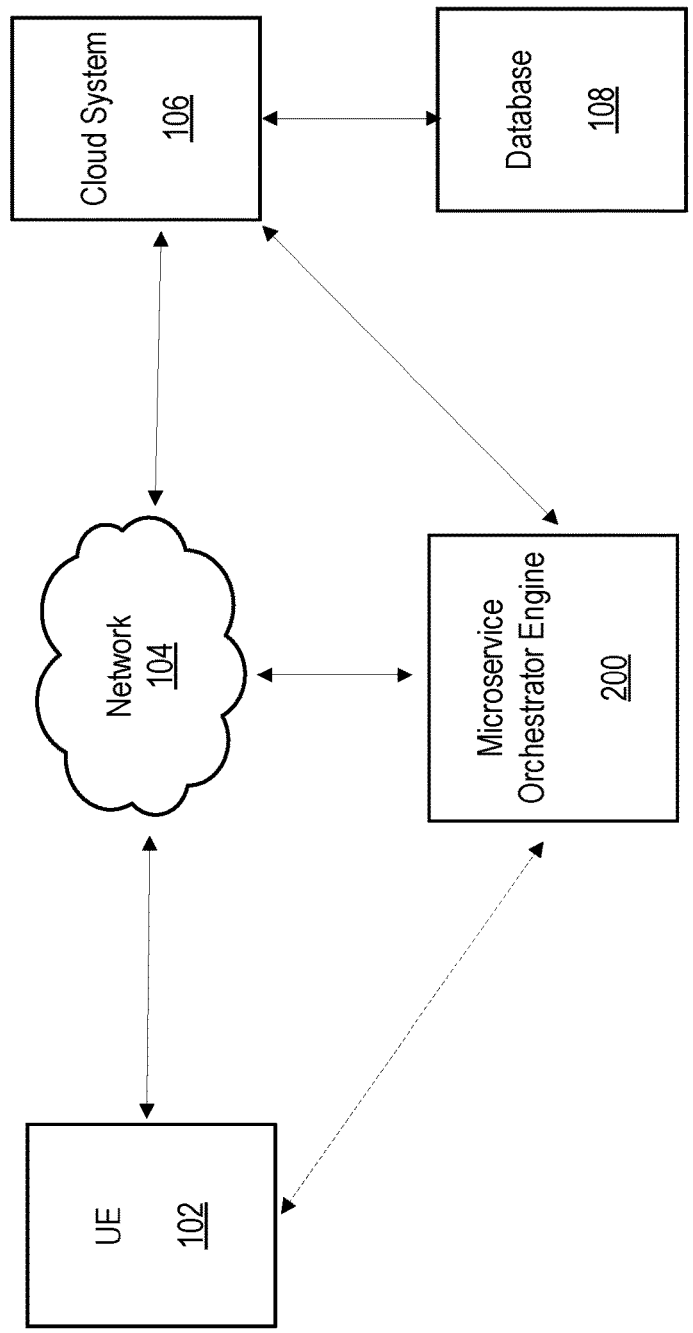
FIG. 1 is a block diagram of an example configuration within which the systems and methods disclosed herein could be implemented according to some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure is described below with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

For the purposes of this disclosure the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles of the instant disclosure will now be described in greater detail. According to some embodiments, in connection with the subject matter disclosed and depicted in FIGS. 1-9, the disclosed systems and methods provide a novel framework for administrating and/or configuring microservice API requests, whereby customized definitions, operations and executable instructions may cause and/or otherwise have associated information stored in a distributed ledger (e.g., blockchain).

According to some embodiments, the disclosed framework involves operations of a microservice orchestrator (e.g., engine 200, discussed infra) in accordance with operations performed on and/or with respect to a distributed network (e.g., a distributed ledger such as, for example, a blockchain). As discussed in detail below, the disclosed framework provides non-native technical functionality for modified API configurations and corresponding updates/storage interactions with memory structures of a blockchain. The disclosed functionality and capabilities provided by the disclosed framework provide novel capabilities for API administration and configuration respective to how workflows of microservices are hosted, executed and stored within and respective to data structures and nodes of a blockchain.

Based on such technical features, further technical benefits become available to users and operators of these systems and methods. Moreover, various practical applications of the disclosed technology are also described, which provide further practical benefits to users and operators that are also new and useful improvements in the art.

With reference to FIG. 1, system 100 is depicted which includes UE 102 (e.g., a client device, as mentioned above), network 104, cloud system 106, database 108 and microservice orchestrator engine 200. UE 102 may be any type of device, such as, but not limited to, a mobile phone, tablet, laptop, sensor, Internet of Things (IoT) device, autonomous machine, and any other device equipped with a cellular or wireless or wired transceiver.

In at least some embodiments, network 104 may be any type of network, such as, but not limited to, a wireless network, cellular network, the Internet, and the like (as discussed above). Network 104 facilitates connectivity of the components of system 100, as illustrated in FIG. 1. Further examples and discussion of network 104 are provided below with reference to FIGS. 3 and 6-9.

Cloud system 106 may be any type of cloud operating platform and/or network based system upon which applications, operations, and/or other forms of network resources may be located. For example, system 106 may be a service provider and/or network provider from where services and/or applications may be accessed, sourced or executed from. In some embodiments, cloud system 106 may include a server(s) and/or a database of information which is accessible over network 104. In some embodiments, a database 108 of cloud system 106 may store a dataset of data and metadata associated with local and/or network information related to a user(s) of UE 102 and the UE 102, and the services and applications provided by cloud system 106 and/or microservice orchestrator engine 200.

By way of a non-limiting example, cloud system 106 may be related to a private/proprietary blockchain-based settlement platform, whereby engine 200, discussed infra, corresponds to the novel functionality system 106 introduces, hosts and provides to a network 104 and other platforms operating thereon. Accordingly, according to at least some embodiments, system 106 may be configured to receive, handle, process, settle and/or decline transaction requests to/from entities, which can include, but are not limited to, banks, users, firms, people, accounts, applications, companies, governments, wallets, and the like, or some combination thereof. Further examples and discussion of cloud system 106 are provided below with reference to FIGS. 6-9.

Microservice orchestrator engine 200, as discussed above and below in more detail, may include components for providing functionality for customized API calls of microservices. According to some embodiments, microservice orchestrator engine 200 may be a special purpose machine or processor and could be hosted by a device on network 104, within cloud system 106 and/or on UE 102. In some embodiments, engine 200 may be hosted by a server and/or set of servers associated with cloud system 106.

According to some embodiments, as discussed in more detail below, microservice orchestrator engine 200 may be configured to control a plurality of microservices, where each of the plurality of microservices are configured to execute a plurality of workflows associated with administering distributed network configurations defining a plurality of parameters associated with the plurality of distributed network data stores.

According to some embodiments, as discussed above, microservice orchestrator engine 200 may function as an application provided by cloud system 106. In some embodiments, engine 200 may function as an application installed on a server(s), network location and/or other type of network resource associated with system 106. In some embodiments, engine 200 may function as application installed and/or executing on UE 102. In some embodiments, such application may be a web-based application accessed by UE 102 over network 104 from cloud system 106 (e.g., as indicated by the connection between network 104 and engine 200, and/or the dashed line between UE 102 and engine 200 in FIG. 1). In some embodiments, engine 200 may be configured and/or installed as an augmenting script, program or application (e.g., a plug-in or extension) to another application or program provided by cloud system 106 and/or executing on UE 102.

Figure 2:
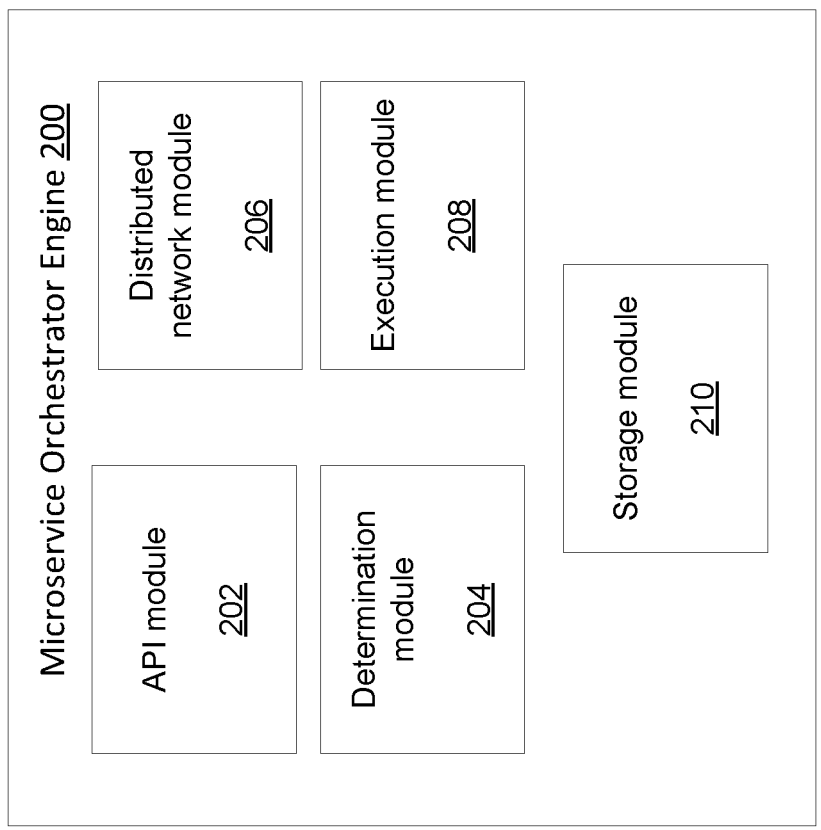
FIG. 2 is a block diagram illustrating components of an exemplary system according to some embodiments of the present disclosure.

As illustrated in FIG. 2, according to some embodiments, microservice orchestrator engine 200 includes API module 202, determination module 204, distributed network module 206, execution module 208 and storage module 210. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 4-5, inter alia.

Figure 3:
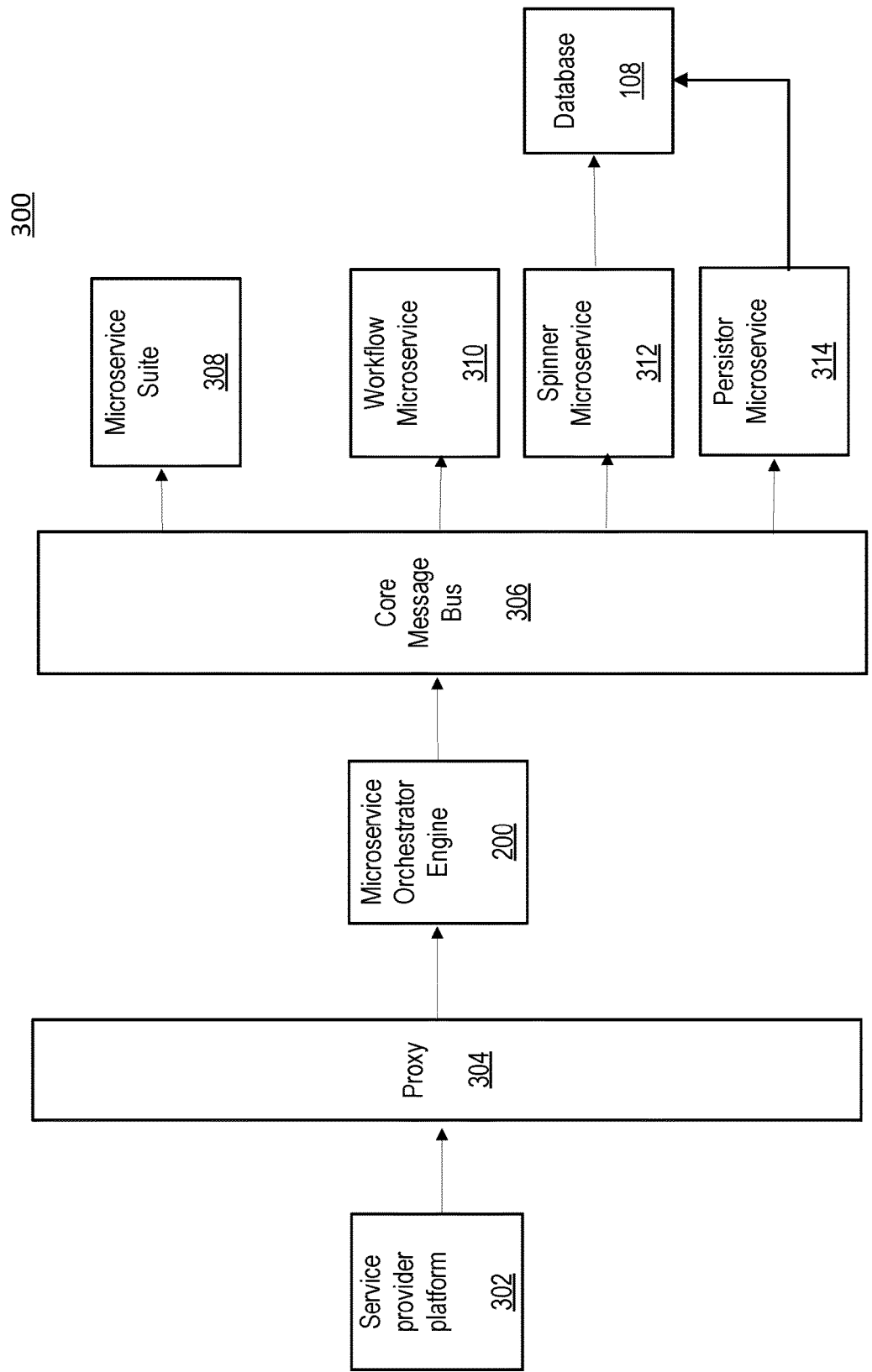
FIG. 3 illustrates an exemplary processing data flow via an exemplary system configuration according to some embodiments of the present disclosure.

Turning to FIG. 3, system 300 illustrates a non-limiting example network environment where customized API calls may be enacted, executed and stored. System 300 includes service provider platform 302, proxy 304, microservice orchestrator engine 200; core message bus 306, microservice suite 308, workflow microservice 310, spinner microservice 310, persistor microservice 314 and database 108. In some embodiments, suite 308 and microservices 310-314 may be embodied as engines and/or executable modules within system 300 on a network (e.g., network 104 of FIG. 1).

According to some embodiments, service provider platform 302 may correspond to a similar entity as discussed above in relation to cloud system 106. For example, platform 302 may represent a blockchain-based settlement platform, which may be inclusive of the interfaces, servers, storage locations and overall network resources typically allocated to such type of entity.

According to some embodiments, platform 302 may trigger an API request, that may lead to a customized API configuration of a microservice and/or smart contract transaction, as discussed below in relation to at least FIGS. 4 and 5, respectively.

According to some embodiments, proxy 304 may correspond to a network server(s) that handles requests from platform 302. In some embodiments, for example, proxy 304 is configured to handle and process any type of known or to be known network request, such as, but not limited to, WebSocket requests, hypertext transfer protocol and hypertext transfer protocol secure (HTTPS) requests, secure file transfer protocol requests (e.g., SSH File Transfer Protocol (SFTP), Transport Control Protocol (TCP) requests, and the like.

According to some embodiments, proxy 304 may be any type of known or to be known server software that provides availably to network (TCP) and application (HTTP/S) layers, such as, but not limited to, High Availability Proxy (HA Proxy), for example.

According to some embodiments, engine 200 provides functionality for the flow of information, tasks and events, which may correspond to and/or provide functionality related to admin API controls, client API controls, microservice controls, gateway API controls, port services, authorization microservices and/or any other type of network operation where requests, such as, for example, HTTPS, are received and processed accordingly on/over a network. As discussed in more detail below in relation to at least FIGS. 4 and 5, engine 200 may select a microservice(s) whereby request configurations and transactions may be executed and stored in a corresponding database.

According to some embodiments, core message bus 306 is configured to receive information from engine 200, whereby the microservices and storage operations are effectuated, as discussed below in more detail. As understood by those of skill in the art, message bus 306 may include, but is not limited to, a data model(s), command set(s) and messaging infrastructure that enables systems to communicate through shared sets of interfaces.

As depicted in FIG. 3, message bus 306 enables the instructional output from engine 200 to pass to the microservice suite 308, and microservices 310-314, respectively. In some embodiments, the component(s) of system 100 that the message bus 306 passes the output to may be based on instructions provided by engine 200. In some embodiments, the information processed by bus 306 and output by bus 306 may be in any type of known or to be known data format and/or structure, such as, but not limited to, binary data transfer object (DTO), for example.

According to some embodiments, the microservice suite 308 may provide architectural and/or organizational network components for independent services that communicate via defined/configurable APIs. Suite 308 may include, but is not limited to, the self-contained services, containers of packaged software functions, a service mesh, a service discovery and an API gateway. Indeed, reference through to microservice components (e.g., engine 200 and components 308-314 may include at least a portion of these elements/components.

According to some embodiments, for example, suite 308 may include microservice components for, but not limited to, thumper microservice, mechanic microservice, utility microservice, failover microservice, sequencer microservice, and the like, or some combination thereof.

According to some embodiments, workflow microservice 310 provides capabilities for execution and management of business processes related to platform 302. In some embodiments, workflow microservice 310 enables the execution of the configured operations and/or transactions discussed in relation to FIGS. 3 and 4.

According to some embodiments, spinner microservice 312 may correspond to a toolbox/took-kit of operationally executable instructions that correspond to storage, mapping and/or modifications of data structures within database 108.

According to some embodiments, persistor microservice 314 may correspond to an engine and/or layer within system 300 where assets/data within database 108 may be accessed, locked and/or unlocked according to the instructions provided by engine 200. In some embodiments, assets, tokens and API history information within the data structures of database 108 that may be accessed and mapped via persistence microservice 314.

According to some embodiments, database 108 may correspond to a data storage for a platform (e.g., platform 302) or a plurality of platforms. Database 108 may receive storage instructions/requests from, for example, engine 200 and microservices 312-314, which may be in any type of known or to be known format, such as, for example, standard query language (SQL).

According to some embodiments, database 108 may correspond to a distributed ledger of a distributed network. In some embodiments, the distributed network may include a plurality of distributed network nodes, where each distributed network node includes and/or corresponds to a computing device associated with at least one entity (e.g., the entity associated with platform 302, for example, discussed supra). In some embodiments, each distributed network node may include at least one distributed network data store configured to store distributed network-based data objects for the at least one entity. For example, database 108 may correspond to a blockchain, where the distributed network-based data objects can include, but are not limited to, account information, entity identifying information, wallet information, device information, network information, credentials, security information, permissions, identifiers, smart contracts, transaction history, and the like, or any other type of known or to be known data/metadata related to an entity's structure, business and/or legal demographics, inter alia.

In some embodiments, a blockchain may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, exemplary distributed blockchain-type ledger implementations of the present disclosure with associated devices may be configured to affect transactions involving Bitcoins and other cryptocurrencies into one another and also into (or between) so-called FIAT money or FIAT currency, and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

Figure 4:
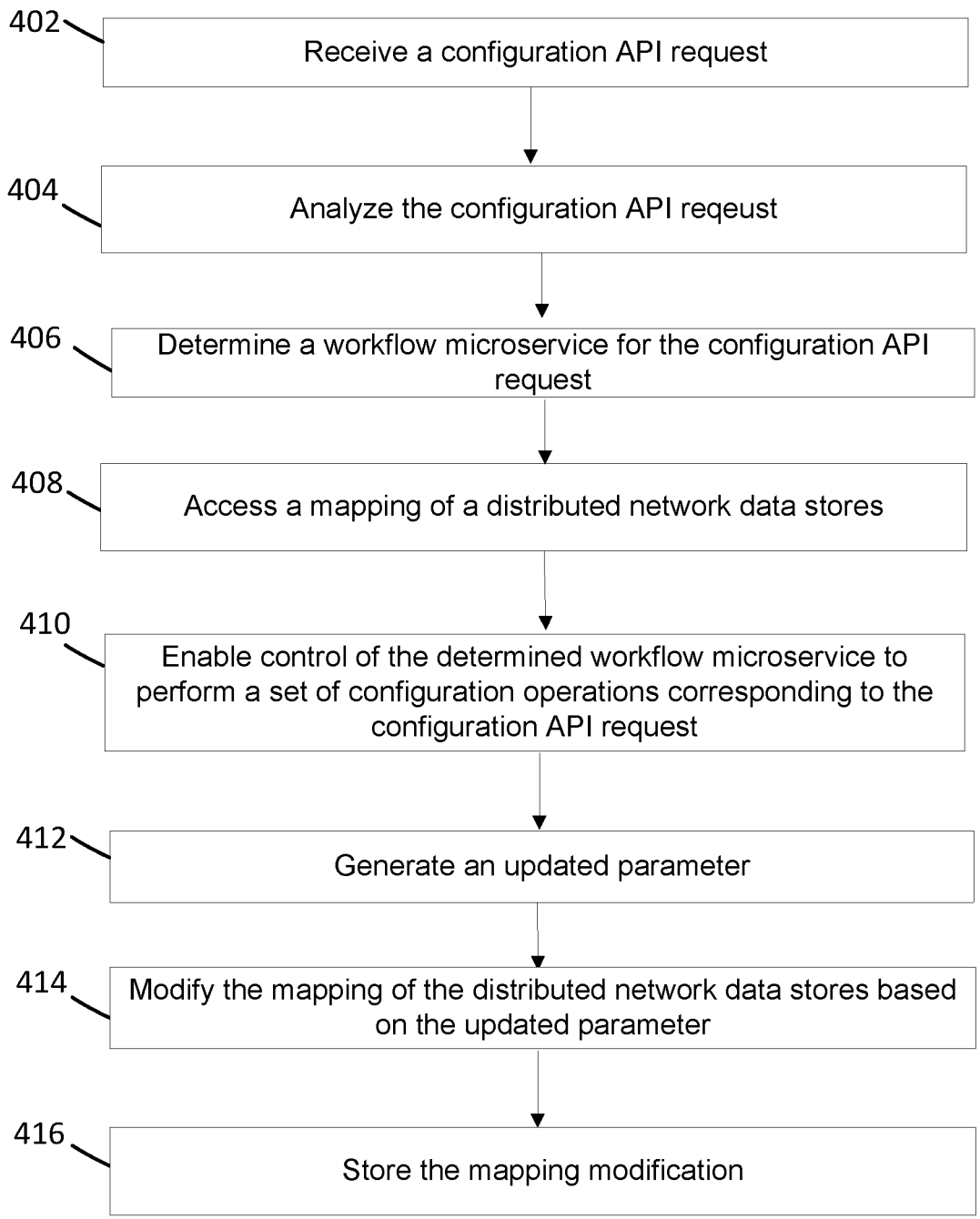
FIG. 4 illustrates an exemplary work flow according to some embodiments of the present disclosure.

Turning to FIG. 4, Process 400 details non-limiting example embodiments of the disclosed microservice orchestrator framework's operations for administrative customizations and control of network-hosted and/or blockchain-related APIs.

According to some embodiments, Steps 402-404 of Process 400 may be performed by API module 202 of microservice orchestrator engine 200; Step 406 may be performed by determination module 204; Steps 408-410 may be performed by distributed network module 206; Steps 412-414 may be performed by execution module 208; and Step 416 may be performed by storage module 210.

Process 400 begins with Step 402 where engine 200 receives a configuration API request. According to some embodiments, the received configuration API request may be defined by a configuration API request structure that includes, but is not limited to, a configuration API request header and a configuration API request body.

In some embodiments, the API request header may include information related to, but not limited to, a source of the request, destination of the request, uniform resource identifier (URI), a type of request, timing of request, identifier of the action/operation, a data structure type, and the like, or any other type of data/metadata capable of being included in an API header, or some combination thereof.

In some embodiments, the API request body may include information related to the type of action, operation or function being requested, a description of the requested action, and the like, or some combination thereof.

In some embodiments, the API request header and body may provide such information, respectively as a value that is capable of being read and interpreted by engine 200. Thus, the API request header can include a configuration API request header value, and the API request body can include a configuration API request body value. In some embodiments, such values may be formatted and/or of a particular type that corresponds to and/or is based on the configuration of the API and/or API request.

In Step 404, engine 200 analyzes the configuration API request, and in Step 406, based on the analysis, a workflow microservice is determined. According to some embodiments, Steps 404-406 may involve engine 200 implementing any type of known or to be known computational analysis technique for parsing the API request and determining, detecting, retrieving, extracting or otherwise identifying the workflow microservice for the configuration API request. In some embodiments, such computational analysis may include, but is not limited to, data mining, computer vision, neural network analysis, feature extraction, and/or any other type of known or to be known machine learning (ML) or artificial intelligence (AI) classifier.

In some embodiments, the workflow microservice determined by engine 200 in Step 406 may be identified based on the value within the API request body. In some embodiments, the workflow microservice may be based on the value within the API request header, and in some embodiments, the workflow microservice may be based on a combination of the values in the API request header and body.

In some embodiments, the determined workflow microservice may be configured to execute at least one workflow associated with performing a configuration operation to affect at least one parameter of the plurality of parameters on behalf of an entity (e.g., that is associated with platform 302, for example, discussed supra).

In Step 408, engine 200 accesses a mapping of a distributed data stores. According to some embodiments, the mapping of the distributed data stores may be associated with at least one memory data structure. In some embodiments, the mapping includes links (or identifies via pointers to remote locations that link) between the distributed network of data stores and a plurality of centralized entity profiles. For example, the links may be URIs for established networked connections between network locations of the entity profiles and the data stores (and locations within such data structures).

According to some embodiments, the mapping of distributed network data stores may include at least one entity-specific data record that is configured to link at least one entity-specific network data store to at least one entity-specific entity profile. In some embodiments, the at least one entity-specific data record includes a plurality of parameters representing at least one characteristic of the entity, where the plurality of parameters may include, but are not limited to, an entity identifier, an entity name, entity contact data, an entity access status, an entity authentication status, an entity token API, and an entity wire API, and the like.

In some embodiments, the mapping of distributed network data stores may further or alternatively include an index (or look-up table (LUT)) having a plurality of entity-specific entries, where at least one entity-specific entry of the index is configured to link at least one entity-specific network data store to at least one entity-specific entity profile.

According to some embodiments, the mapping of distributed network data stores may be synchronized across a distributed network of distributed network nodes. In some embodiments, such synchronization may occur at predetermined intervals, upon detection of specific events, or some combination thereof. For example, upon the updating of the mapping (as discussed supra), engine 200 may effectuate a synchronization event across the distributed network.

In Step 410, engine 200 may enable control of the determined workflow microservice to perform a set of configuration operations corresponding to the configuration API request. In some embodiments, Step 410 may involve generating, formatting and/or customizing and sending a specific type of message to another network component (e.g., core message bus) such that the requested operations may be received, processed and performed by the dedicated/identified components on the network. For example, the message may be a binary DTO, SFTP, HTTP/S and/or SQL message, as discussed above in relation to FIG. 3. In some embodiments, authorizations may be effectuated (e.g., open authorization (OAuth)), which may enable such control over the network.

In some embodiments, Step 410 may involve sub-steps that correspond to authorizing the control and/or configuration of the microservice. In some embodiments, engine 200 may determine a source device associated with the configuration API request. In some embodiments, the identity (or identifier (ID)) may be determined, derived or otherwise identified from the request from Step 402, the API request header and/or the mapping and/or entity profile information (discussed in relation to Step 408), as discussed above.

In some embodiments, upon identifying the source device, engine 200 may determine an authorization status of an administrative authorization of the source device, which may include, but is not limited to, administrative status (e.g., administrative authorization—read/write access), user authorization (e.g., permitted read/write access) and unauthorized (e.g., no read/write access). In some embodiments, based on the type of access permitted to the determined type of user/entity, engine 200 may effectuate the control of Step 410.

Accordingly, Steps 412-416 may be effectuated (or caused to be executed) via the control provided in Step 410. In Step 412, engine 200 may cause at least one updated parameter to be generated, where the parameter(s) is associated the entity, and the update/modification to the parameter is based on the value in the API request body.

In Step 414, engine 200 may cause a modification to the mapping of the distributed network data stores to be generated, which may be based on the updated parameter(s) from step 412. Such modification may cause the mapping to change from an initial mapping to an updated mapping, which may impact how the mapping is configured, and may impact how a data structure designating/defining such mapping is configured/stored.

And in Step 416, engine 200 may cause information related to the mapping modification (of Step 414) to be stored in the at least one memory structure. In some embodiments, the stored information may also include data related to the updated parameter(s) (from Step 412). Accordingly, in some embodiments, Step 416 results in the execution of the configuration operation requested in Step 402.

In some embodiments, as discussed above, upon the mapping being modified (and stored, in some embodiments), engine 200 may determine permissioned distributed network nodes in the distributed network of distributed network nodes, and then synchronize the mapping of distributed network data stores across the permissioned distributed network nodes. In some embodiments, the distributed network may be a private-permissioned blockchain.

Figure 5:
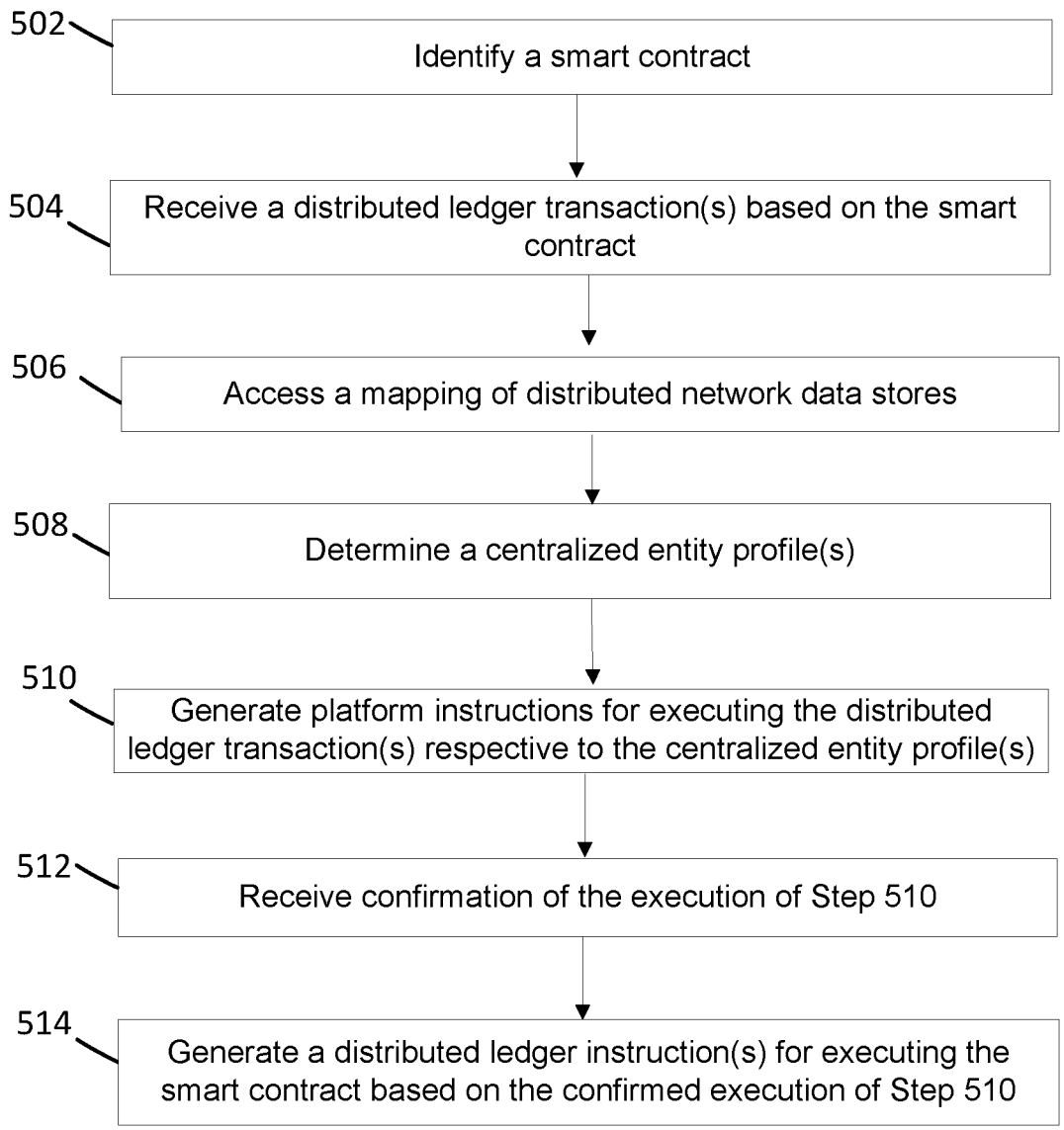
FIG. 5 illustrates an exemplary work flow according to some embodiments of the present disclosure.

FIG. 5 provides Process 500 which details non-limiting example embodiments of the disclosed microservice orchestrator framework's operations for executing custom API operations according to a smart contract. Accordingly, in some embodiments, engine 200 operates to control a transaction microservice (which in some embodiments, may be configured and/or identified from the processing steps discussed above in relation to Process 400 of FIG. 4).

According to some embodiments, Steps 502-504 of Process 500 may be performed by API module 202 of microservice orchestrator engine 200; Step 506 may be performed by distributed network module 206; and Steps 508, 510 and 514 may be performed by execution module 208 (in some embodiments, Step 514 may additionally or alternatively be performed by storage module 210); and Step 512 may be performed by determination module 204.

Process 500 begins with Step 502 where engine 200 identifies a smart contract. As discussed above, a smart contract is a computer process(es) that facilitates, verifies and/or enforces negotiation and/or performance of one or more particular activities among users/parties. Smart contracts may be programs that are stored on a blockchain that run when predetermined conditions are met. Smart contracts may be used to automate the execution of an agreement so that all participants may be immediately certain of the outcome, without any intermediary's involvement or time loss. Smart contracts may also automate a workflow (e.g., a microservice, for example), thereby triggering a particular and/or next action when conditions are met.

In Step 504, the smart contract may be analyzed, and as a result, at least one distributed ledger transaction is identified. In some embodiments, the at least one distributed ledger transaction corresponds to at least one transaction microservice for the execution of at least one workflow. For example, a workflow can correspond to specific functionality for executing a transaction, for example, a bank transaction from a dedicated bank platform to a blockchain, as discussed herein.

According to some embodiments, the at least one distributed ledger transaction may include at least one transaction instruction that includes transaction data specifying at least one profile transaction (as discussed below in relation to at least Step 508).

In some embodiments, Step 504 may involve engine 200 receiving (or retrieving or extracting) information related to the at last one distributed ledger transaction. In some embodiments, the smart contract may be built around the at least one distributed ledger transaction, and in some embodiments, the at least one distributed ledger transaction may be one of many executable portions of the smart contract. Accordingly, the at least one distributed ledger transaction may be identified/received from at least one distributed network data store, and is executable on at least one distributed ledger of a distributed network.

In Step 506, engine 200 may access a mapping of the distributed network data stores. The execution of Step 506 by engine 200 may be performed in a similar manner as discussed above in relation to at least Step 408 of Process 400.

In Step 508, engine 200 determines at least one centralized entity profile based on the mapping identified in Step 506. In some embodiments, the at least one centralized entity profile is identified from a collection of a plurality of centralized entity profiles. In some embodiments, the determined at least one centralized entity profile is linked to the at least one distributed network data store in the mapping of the distributed network data stores. In some embodiments, such linking may be configured and/or performed in a similar manner as discussed above in relation to at least Step 408 of Process 400.

In Step 510, engine 200 generates platform instructions for executing the at least one distributed ledger transaction of the at least one distributed ledger transaction, whereby the execution is respective to (or based on) the determined centralized entity profile(s). Accordingly, in some embodiments, at least one platform instructions are generated, which cause at least one centralized profile platform to execute at least one profile transaction with respect to at least one centralized entity profile.

In Step 512, engine 200 may receive, from at least one centralized profile platform, a confirmation of execution of the at least one profile transaction (that was performed in Step 510). In some embodiments, the confirmation may be a notification that indicates the output of the transaction; in some embodiments, the confirmation may be a write action to a blockchain, for example.

In Step 514, engine 200 may generate a distributed ledger instruction(s) for executing the smart contract (e.g., at least the transaction(s) included therein) based on the confirmation of execution from Step 510. Accordingly, in some embodiments, Step 514 involves engine 200 generating at least one distributed ledger instruction that is configured to cause the at least one transaction of the smart contract to execute the at least one distributed ledger transaction with respect to the at least one distributed network data store based at least in part on the confirmation of execution of the at least one profile transaction.

According to some embodiments, the at least one distributed ledger transaction may correspond to at least one token transaction and/or reference data, where the reference data may correspond to at least one centralized profile platform. In some embodiments, the reference data may include information related to at least one transaction and may be stored in a database table. In some embodiments, the database table may be associated with the at least one distributed ledger, and in some embodiments, may correspond to a table within a separate, associated database. In some embodiments, the reference data may further include information related to a currency value associated with the at least one token of the at least one transfer. Accordingly, in some embodiments, engine 200 may then generate the at least one platform instruction based on the reference data, which, in some embodiments, may cause the at least one centralized profile platform to execute the at least one profile transaction including the currency value. In some embodiments, such executed transaction may involve reference data associated with a third party currency platform (e.g., a bank or wallet, for example) being updated according to the reference data and the information included therein.

Figure 6:
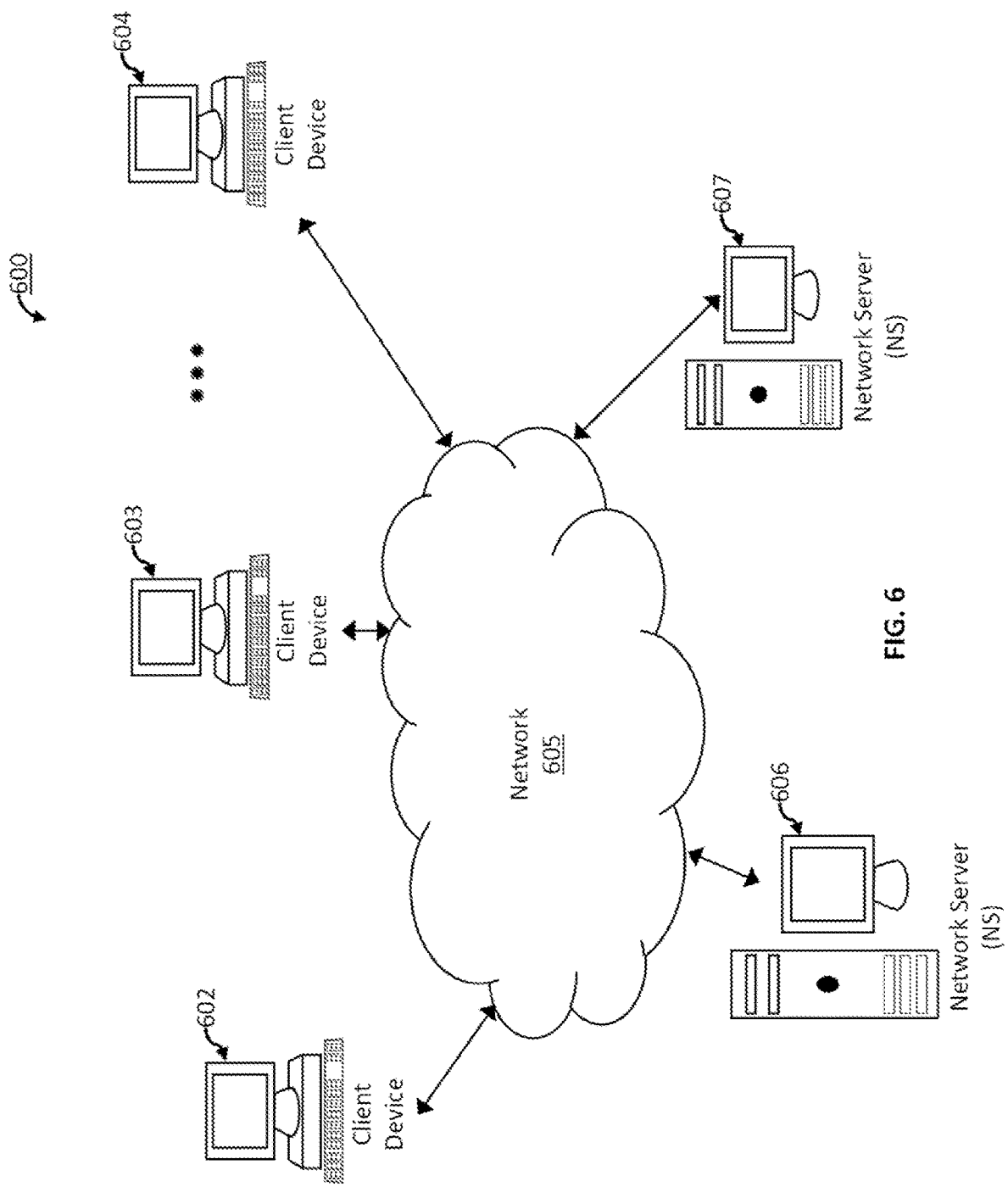
FIG. 6 is a block diagram depicting an exemplary computer-based system according to some embodiments of the present disclosure.

FIG. 6 depicts a block diagram of an exemplary computer-based system and platform 600 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, and the like). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications may be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, and the like. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
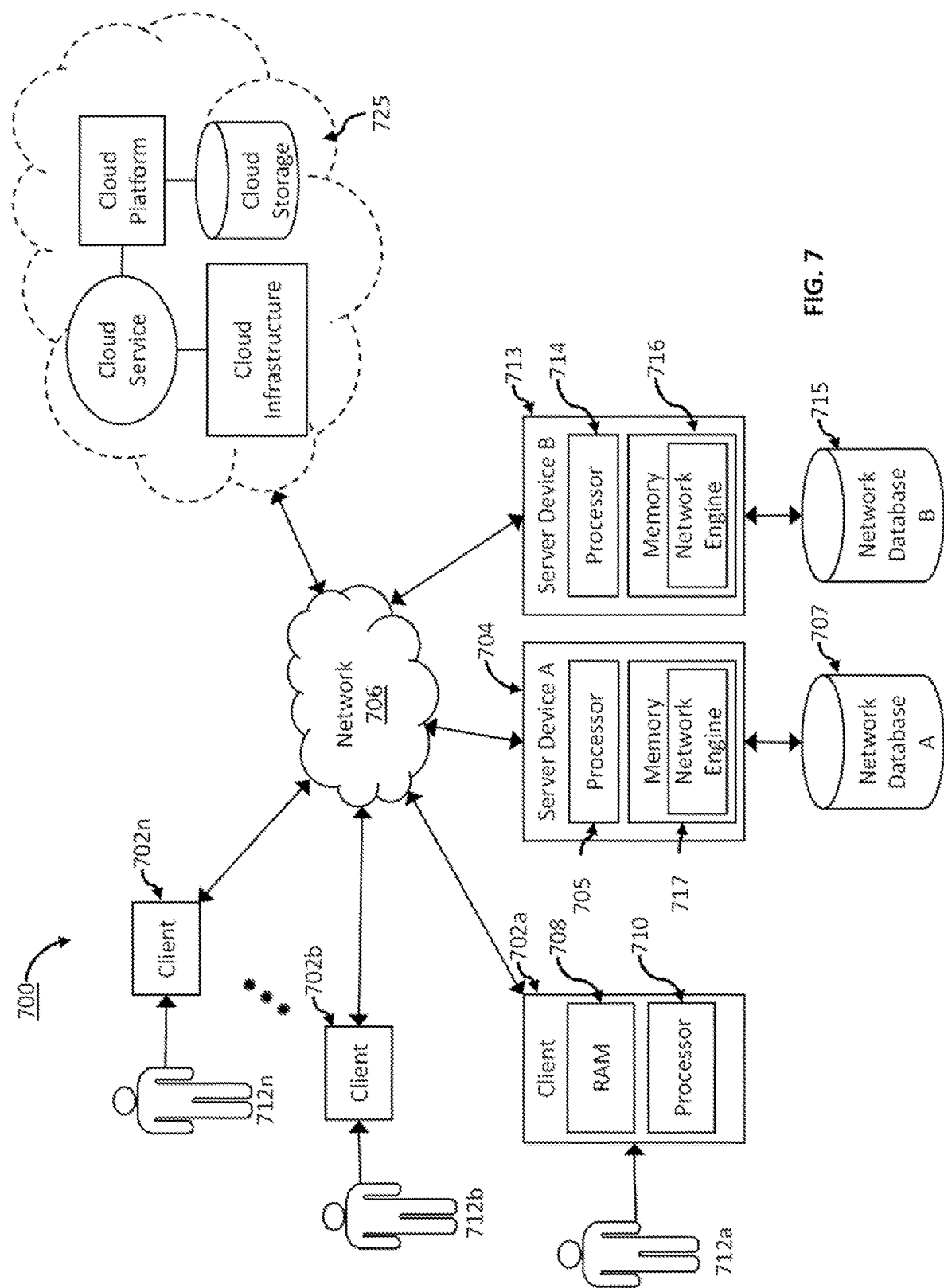
FIG. 7 depicts a block diagram of another exemplary computer-based system and platform according to some embodiments of the present disclosure.

FIG. 7 depicts a block diagram of another exemplary computer-based system and platform 700 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702a, member computing device 702b through member computing device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and the like.

In some embodiments, member computing devices 702a through 702n may also include a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™, Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
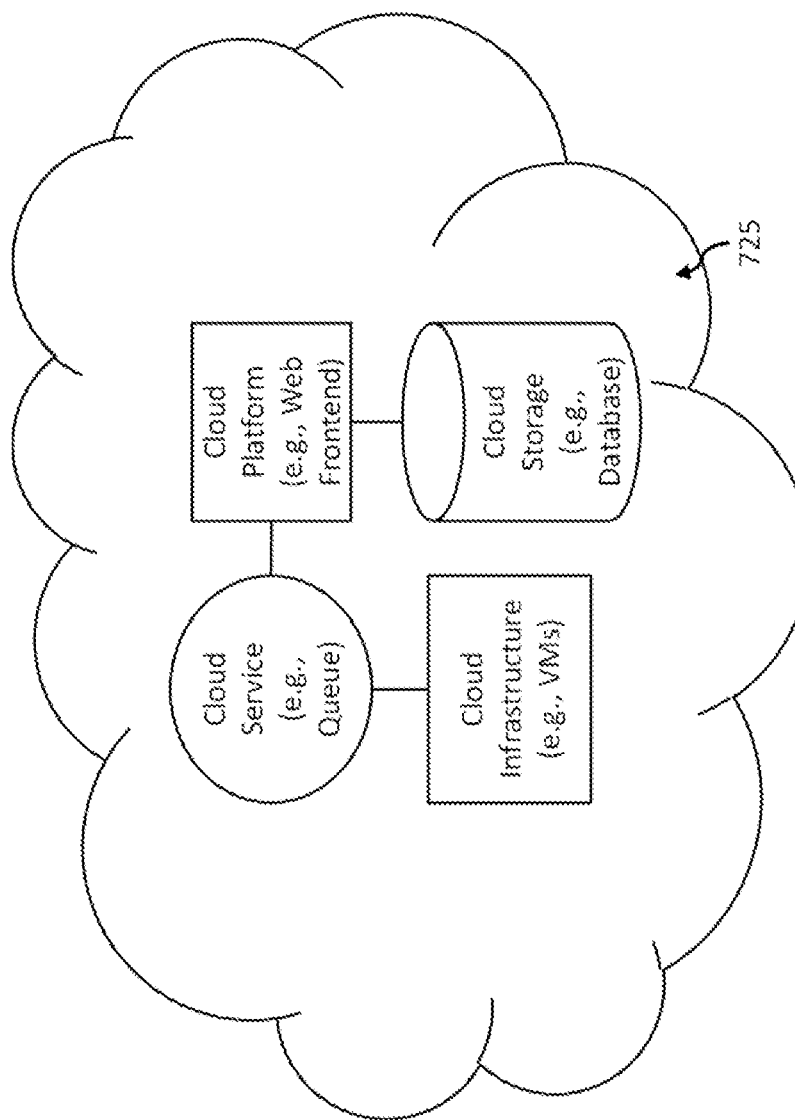
FIG. 8 depicts illustrative schematics of an exemplary implementation of the cloud computing/architecture(s) according to some embodiments of the present disclosure.
Figure 9:
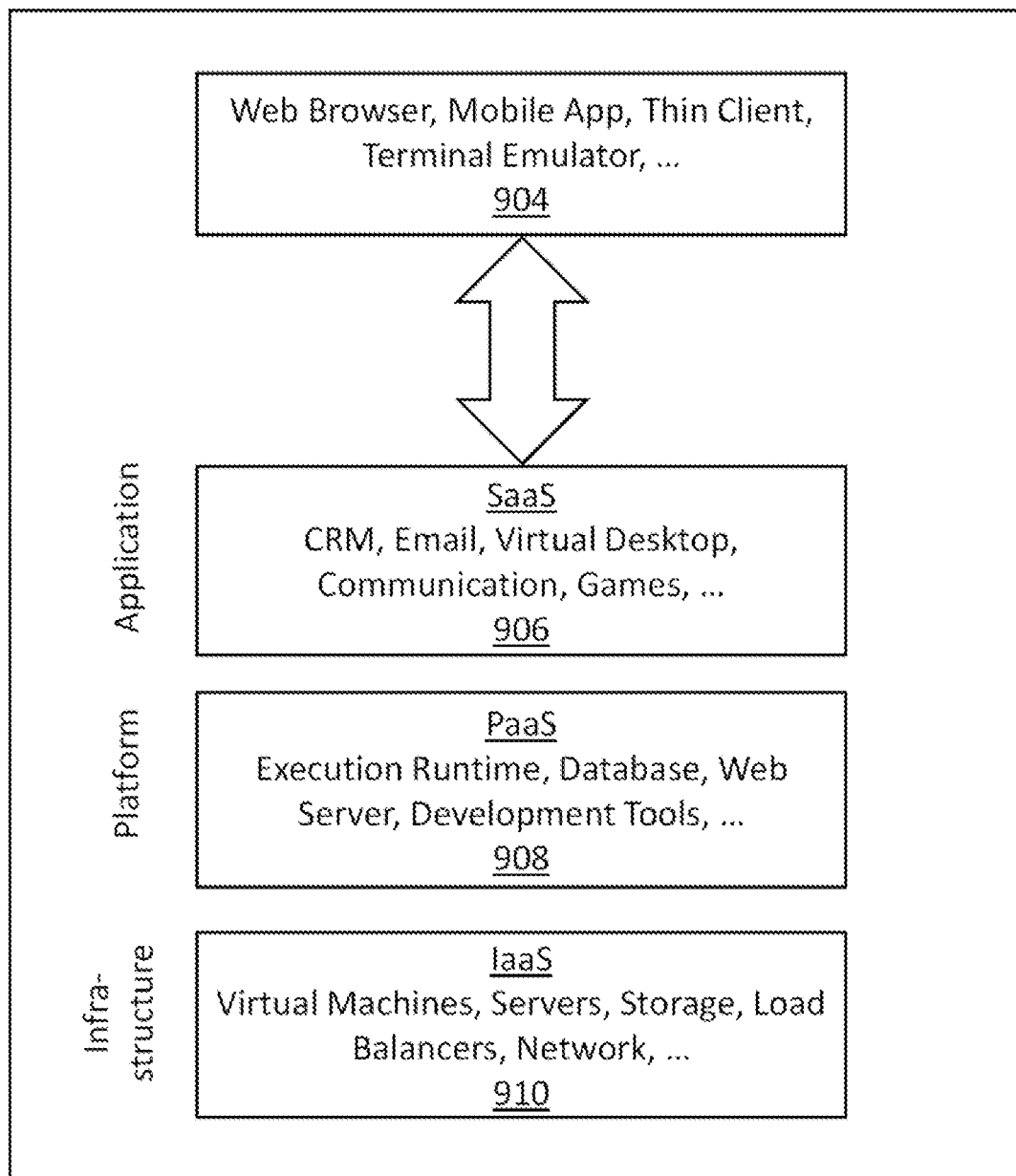
FIG. 9 depicts illustrative schematics of another exemplary implementation of the cloud computing/architecture(s) according to some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems for administrative customizations and control of network-hosted and/or blockchain-related APIs via a workflow service (and/or microservice) of a blockchain environment of the present disclosure may be specifically configured to operate.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, and the like.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, and the like), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., and the like). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

The aforementioned examples are, of course, illustrative, and not restrictive.

At least some aspects of the present disclosure will now be described with reference to the following numbered clauses.

1. A system including:
    a distributed ledger of a distributed network;
        where the distributed network includes a plurality of distributed network nodes;
        where each distributed network node of the plurality of distributed network nodes includes a computing device associated with at least one entity;
        where each distributed network node includes at least one distributed network data store configured to store distributed network-based data objects for the at least one entity;
    at least one microservice orchestrator configured to control a plurality of microservices;
        where the plurality of microservices is configured to execute a plurality of workflows associated with administering distributed network configurations defining a plurality of parameters associated with the plurality of distributed network data stores;
        where the at least one microservice orchestrator is configured to:
            receive, via at least one configuration application programming interface (API), a configuration API request;
                where the configuration API defines a configuration API request structure including:
                    a configuration API request header and
                    a configuration API request body;
                where the configuration API request includes:
                    at least one configuration API request header value according to the configuration API request header, and
                    at least one configuration API request body value according to the configuration API request body;
            determine, based on the at least one configuration API request body value, at least one workflow microservice configured to execute at least one workflow associated with performing a configuration operation to affect at least one parameter of a plurality of parameters on behalf of an entity;
            access, in at least one memory structure, a mapping of distributed network data stores;
                where the mapping of distributed network data stores links the plurality of distributed network data stores to a plurality of centralized entity profiles;
            control the at least one workflow microservice to execute the at least one workflow to:
                generate at least one updated parameter associated with the entity based at least in part on the at least one configuration API request body value,
                    where the at least one updated parameter includes at least one change to the at least one parameter,
                generate a modification to the mapping of distributed network data stores based at least in part on the at least one updated parameter, and
                store the modification in the at least one memory structure so as to execute the configuration operation.

2. The system of clause 1, where the at least one microservice orchestrator is further configured to:
    determine a source device associated with the configuration API request;
    determine an authorization status of an administrative authorization of the source device, where the authorization status includes at least one of:
        the administrative authorization,
        a user authorization, and
        unauthorized; and
    control the at least one workflow microservice to execute the at least one workflow based at least in part on the authorization status being the administrative authorization.

3. The system of clause 1, where the mapping of distributed network data stores includes at least one entity-specific data record that is configured to link at least one entity-specific network data store to at least one entity-specific entity profile.

4. The system of clause 3, where the at least one entity-specific data record includes a at least one characteristic of the entity, where the at least one characteristic comprises:
    an entity identifier,
    an entity name,
    entity contact data,
    an entity access status,
    an entity authentication status,
    an entity token API, and
    an entity wire API.

5. The system of clause 1, where the mapping of distributed network data stores includes an index having a plurality of entity-specific entries;
    where at least one entity-specific entry of the index is configured to link at least one entity-specific network data store to at least one entity-specific entity profile.

6. The system of clause 1, where the at least one microservice orchestrator is further configured to synchronize the mapping of distributed network data stores across a distributed network of distributed network nodes.

7. The system of clause 6, where the at least one microservice orchestrator is further configured to:
    determine permissioned distributed network nodes in the distributed network of distributed network nodes;
        where the distributed network includes a private-permissioned blockchain; and
    synchronize the mapping of distributed network data stores across the permissioned distributed network nodes.

8. The system of clause 1, where the at least one microservice orchestrator is further configured to:
- receive, from at least one transaction smart contract, at least one distributed ledger transaction associated with at least one distributed network data store;
  - where the at least one distributed ledger transaction is executed on at least one distributed ledger of a distributed network;
  - where the distributed network includes a plurality of distributed network nodes;
- control at least one transaction microservice to execute the at least one workflow to:
  - access the mapping of distributed network data stores;
  - determine at least one centralized entity profile of the plurality of centralized entity profiles based at least in part on the mapping of distributed network data stores;
    - where the at least one centralized entity profile is linked to the at least one distributed network data store in the mapping of distributed network data stores;
  - generate at least one platform instruction configured to cause at least one centralized profile platform to execute at least one profile transaction with respect to the at least one centralized entity profile based at least in part on the at least one distributed ledger transaction;
  - receive, from the at least one centralized profile platform, a confirmation of execution of the at least one profile transaction; and
  - generate at least one distributed ledger instruction configured to cause the at least one transaction smart contract to execute the at least one distributed ledger transaction with respect to the at least one distributed network data store based at least in part on the confirmation of execution of the at least one profile transaction.

9. The system of clause 8, where the at least one distributed ledger transaction may be associated with reference data, where the reference data includes information related to the at least one transaction and may be stored in a database table.

10. The system of clause 8, where the reference data may be utilized to update reference data associated with a third party platform, where the third party platform may correspond to a bank and/or currency hosting and/or providing platform.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:
1. A system comprising:
a distributed ledger of a distributed network;
at least one processor configured to control a plurality of microservices to:
- receive, via at least one configuration application programming interface (API), a configuration API request;
  - generate at least one updated parameter associated with at least one entity based at least in part on the at least one configuration API request,
  - generate a modification to a mapping of a plurality of distributed network data stores based at least in part on the at least one updated parameter;
- receive, from at least one transaction smart contract, at least one distributed ledger transaction associated with the at least one distributed network data store of the plurality of distributed network data stores;
  - wherein the at least one distributed ledger transaction is executed on at least one distributed ledger of the distributed network;
- control at least one transaction microservice to execute at least one workflow so as to:
  - access the mapping of the plurality of distributed network data stores;
  - determine at least one centralized entity profile of the plurality of centralized entity profiles based at least in part on the mapping of the plurality of distributed network data stores;
    - wherein the at least one centralized entity profile is linked to the at least one distributed network data store in the mapping of the plurality of distributed network data stores;
  - generate at least one platform instruction configured to cause at least one centralized profile platform to execute at least one profile transaction with respect to the at least one centralized entity profile based at least in part on the at least one distributed ledger transaction;
  - receive, from the at least one centralized profile platform, a confirmation of execution of the at least one profile transaction; and
  - generate at least one distributed ledger instruction configured to cause the at least one transaction smart contract to execute the at least one distributed ledger transaction with respect to the at least one distributed network data store based at least in part on the confirmation of execution of the at least one profile transaction.

2. The system of claim 1, wherein at least one microservice orchestrator is further configured to:
determine a source device associated with the configuration API request;
determine an authorization status of an administrative authorization of the source device,
  wherein the authorization status comprises at least one of:
    the administrative authorization,
    a user authorization, and
    unauthorized; and
control at least one workflow microservice to execute the at least one workflow based at least in part on the authorization status being the administrative authorization.

3. The system of claim 1, wherein the mapping of the plurality of distributed network data stores comprises at least one entity-specific data record that is configured to link at least one entity-specific network data store to at least one entity-specific entity profile.

4. The system of claim 3, wherein the at least one entity-specific data record comprises at least one characteristic of the entity, wherein the at least one characteristic comprises:
  an entity identifier,
  an entity name,
  entity contact data,
  an entity access status,
  an entity authentication status,
  an entity token API, and
  an entity wire API.

5. The system of claim 1, wherein the mapping of the plurality of distributed network data stores comprises an index having a plurality of entity-specific entries;
  wherein at least one entity-specific entry of the index is configured to link at least one entity-specific network data store to at least one entity-specific entity profile.

6. The system of claim 1, wherein at least one microservice orchestrator is further configured to synchronize the mapping of a plurality of distributed network data stores across the distributed network of a plurality of distributed network nodes.

7. The system of claim 6, wherein at least one microservice orchestrator is further configured to:
  determine permissioned distributed network nodes in the distributed network of a plurality of distributed network nodes;
    wherein the distributed network comprises a private-permissioned blockchain; and
  synchronize the mapping of the plurality of distributed network data stores across the permissioned distributed network nodes.

8. The system of claim 1, wherein the at least one distributed ledger transaction is associated with reference data, where the reference data comprises information related to the at least one transaction and is stored in a database table.

9. The system of claim 1, where the reference data is configured to be utilized to update reference data associated with a third party currency platform.

10. A method comprising:
  receiving, by at least one processor from at least one transaction smart contract, at least one distributed ledger transaction associated with at least one distributed network data store of plurality of distributed network data stores;
    wherein the at least one distributed ledger transaction is executed on at least one distributed ledger of a distributed network;
    wherein the distributed network comprises a plurality of distributed network nodes;
  receiving, by a device, via at least one configuration application programming interface (API), a configuration API request, the configuration API defines a configuration API request structure comprising a configuration API request header and a configuration API request body, wherein the configuration API request comprises at least one configuration API request header value according to the configuration API request header, and at least one configuration API request body value according to the configuration API request body;
  determining, by the device, based on the at least one configuration API request body value, at least one workflow microservice configured to execute at least one workflow associated with performing a configuration operation to affect at least one parameter of a plurality of parameters on behalf of an entity;
  accessing, by the device, in at least one memory structure, a mapping of the plurality of distributed network data stores, the mapping of the plurality of distributed network data stores links the plurality of distributed network data stores to a plurality of centralized entity profiles; and
  controlling, by the device, the at least one workflow microservice to execute the at least one workflow so as to:
    generate, by the device, at least one updated parameter associated with the entity based at least in part on the at least one configuration API request body value, the at least one updated parameter comprises at least one change to the at least one parameter,
    generate, by the device a modification to the mapping of the plurality of distributed network data stores based at least in part on the at least one updated parameter, and
    store, by the device, the modification in the at least one memory structure so as to execute the configuration operation.

11. The method of claim 10, further comprising:
  determining a source device associated with the configuration API request;
  determining an authorization status of an administrative authorization of the source device, wherein the authorization status comprises at least one of:
    the administrative authorization,
    a user authorization, and
    unauthorized; and
  controlling the at least one workflow microservice to execute the at least one workflow based at least in part on the authorization status being the administrative authorization.

12. The method of claim 10, wherein the mapping of the plurality of distributed network data stores comprises at least one entity-specific data record that is configured to link at least one entity-specific network data store to at least one entity-specific entity profile, wherein the at least one entity-specific data record comprises a plurality of parameters representing at least one characteristic of the entity, wherein the plurality of parameters comprise at least one of:
  an entity identifier,
  an entity name,
  entity contact data,
  an entity access status,
  an entity authentication status,
  an entity token API, and
  an entity wire API.

13. The method of claim 10, wherein the mapping of the plurality of distributed network data stores comprises an index having a plurality of entity-specific entries, wherein at least one entity-specific entry of the index is configured to link at least one entity-specific network data store to at least one entity-specific entity profile.

14. The method of claim 10, further comprising:
  synchronizing the mapping of the plurality of distributed network data stores across the distributed network of the plurality of distributed network nodes.

15. The method of claim 14, further comprising;
  determining permissioned distributed network nodes in the distributed network of the plurality of distributed network nodes, wherein the distributed network comprises a private-permissioned blockchain; and
  synchronizing the mapping of the plurality of distributed network data stores across the permissioned distributed network nodes.

16. The method of claim 10, further comprising:
controlling at least one transaction microservice to execute the at least one workflow so as to:
  access the mapping of the plurality of distributed network data stores;
  determine at least one centralized entity profile of the plurality of centralized entity profiles based at least in part on the mapping of the plurality of distributed network data stores;
    wherein the at least one centralized entity profile is linked to the at least one distributed network data store in the mapping of the plurality of distributed network data stores;
  generate at least one platform instruction configured to cause at least one centralized profile platform to execute at least one profile transaction with respect to the at least one centralized entity profile based at least in part on the at least one distributed ledger transaction;
  receive, from the at least one centralized profile platform, a confirmation of execution of the at least one profile transaction; and
  generate at least one distributed ledger instruction configured to cause the at least one transaction smart contract to execute the at least one distributed ledger transaction with respect to the at least one distributed network data store based at least in part on the confirmation of execution of the at least one profile transaction.

17. The method of claim 16, wherein the at least one distributed ledger transaction is associated with reference data, where the reference data comprises information related to the at least one transaction and is stored in a database table.

18. The method of claim 16, where reference data is configured to be utilized to update reference data associated with a third party currency platform.

19. A computing device comprising:
at least one processor in communication with a non-transitory computer-readable storage medium tangibly encoded with computer-executable instructions, wherein the at least one processor is configured, upon exaction of the computer-executable instructions, to perform a method comprising:
  receiving, by the at least one processor from at least one transaction smart contract, at least one distributed ledger transaction associated with at least one distributed network data store of plurality of distributed network data stores;
    wherein the at least one distributed ledger transaction is executed on at least one distributed ledger of a distributed network;
    wherein the distributed network comprises a plurality of distributed network nodes;
  receiving, by the at least one processor, via at least one configuration application programming interface (API), a configuration API request, the configuration API defines a configuration API request structure comprising a configuration API request header and a configuration API request body, wherein the configuration API request comprises at least one configuration API request header value according to the configuration API request header, and at least one configuration API request body value according to the configuration API request body;
  determining, by the at least one processor, based on the at least one configuration API request body value, at least one workflow microservice configured to execute at least one workflow associated with performing a configuration operation to affect at least one parameter of a plurality of parameters on behalf of an entity;
  accessing, by the at least one processor, in at least one memory structure, a mapping of the plurality of distributed network data stores, the mapping of the plurality of distributed network data stores links the plurality of distributed network data stores to a plurality of centralized entity profiles; and
  controlling, by the at least one processor, the at least one workflow microservice to execute the at least one workflow so as to:
    generate, by the at least one processor, at least one updated parameter associated with the entity based at least in part on the at least one configuration API request body value, the at least one updated parameter comprises at least one change to the at least one parameter,
    generate, by the at least one processor a modification to the mapping of the plurality of distributed network data stores based at least in part on the at least one updated parameter, and
    store, by the at least one processor, the modification in the at least one memory structure so as to execute the configuration operation.

* * * * *